USOO5535846A

United States Patent [19]

Kurtz, Jr. et al.

[11] Patent Number: 5,535,846
[45] Date of Patent: Jul. 16, 1996

[54] TRACTOR HOOD LATCH MECHANISM

[75] Inventors: Robert D. Kurtz, Jr., Leola; David B. Stauffer, New Holland, both of Pa.

[73] Assignee: New Holland North America, Inc., New Holland, Pa.

[21] Appl. No.: 461,452

[22] Filed: Jun. 5, 1995

Related U.S. Application Data

[62] Division of Ser. No. 302,457, Sep. 9, 1994, abandoned.
[51] Int. Cl.⁶ .................................................. B62D 25/12
[52] U.S. Cl. .................................. 180/69.21; 292/DIG. 14
[58] Field of Search .............................. 180/69.21, 69.2; 292/DIG. 14, DIG. 25, DIG. 43

[56] References Cited

U.S. PATENT DOCUMENTS 2,197,648  4/1940  Mersheimer ........................ 180/69.21
3,064,748  11/1962  Hill ..................................... 180/69.21
3,572,813  3/1971  Takada ............................... 180/69.21

*Primary Examiner*—Karin L. Tyson
*Attorney, Agent, or Firm*—Larry W. Miller; Frank A. Seemar

[57] ABSTRACT

A rearwardly pivotable hood for enclosing a tractor engine is disclosed wherein a latching mechanism selectively retains the hood in a closed position. The latching mechanism includes a releasable clasp member mounted on the subframe structure supporting the air intake apparatus for the engine along a longitudinally extending centerline of the chassis forwardly of said hinge axis. The latching mechanism further includes a centrally positioned latch pin supported from the hood in alignable with the clasp member. A remote release mechanism, including a pivoted handle and a connecting linkage transferring pivotal motion of the handle to the clasp member for actuation thereof, is operable to effect actuation of the latching mechanism from a location along a transverse side of the hood. The pivoted handle can be access through the opening of the daily access door to initiate the raising of the hood for full access to the engine.

6 Claims, 8 Drawing Sheets

TRACTOR HOOD LATCH MECHANISM

CROSS-REFERENCE TO RELATED APPLICATIONS

This application is a divisional of co-pending U.S. patent application Ser. No. 08/302,457, filed Sep. 9, 1994, and entitled "Rearwardly Pivotable Tractor Hood" now abandoned.

BACKGROUND OF THE INVENTION

This invention relates generally to off-road motor vehicles, such as tractors, and more particularly, to an engine hood enclosure for the tractor engine in which the hood is rearwardly pivotable and is latchable in an intermediate opened position and a fully opened position.

Tractors, particularly tractors used in an agricultural environment, are typically provided with a hood enclosure that has pivotable parts to provide access to the engine for service thereof. Generally, tractor hoods do not utilize engine hoods that pivotally move as an entire unit to provide access to the tractor engine; however, one piece hood configurations can be more economically produced.

In known engine hood configurations, access for daily maintenance components is attained merely by lifting or removing a side panel of the engine hood. Furthermore, raising the hood to fully expose the engine subjects the hood to wind forces, while daily maintenance, such as oil level checking, etc., can be accomplished without fully raising the hood relative to the engine. Accordingly, it would be desirable to provide a rearwardly pivotable engine hood for a tractor in which the hood is positionable in at least one intermediate position.

Economical manufacture of a one piece engine hood enclosure is a desirable goal. One piece polymer hoods have the advantage of being molded in an aesthetically pleasing shape; however, certain manufacturing processes require the hood to have substantially uniform material thicknesses to accomplish a high gloss exterior finish and minimize tooling costs. Accordingly, no bosses can be molded into the body of the hood to enable the fastening of mounting components, such as the hinge for pivotally mounting the hood to the chassis. Accordingly, it would be desirable to provide a hinge and a process for mounting the hinge to the body of the hood to facilitate the use of a one piece polymer tractor engine hood.

Similarly, the problem of latching the engine hood in a closed position is amplified by a hood configuration that requires compactness and does not provide mounting bosses on the under-surface of the hood. Furthermore, the latch mechanism must be adjustable to enable the mating latch components to interengage in the prescribed manner. The location for mounting the latch must be structurally sound and is preferably accessible from either side of the tractor. Likewise, the hinge mechanism must also be adjustable to enable a proper and desirable mating of the engine hood to the tractor chassis or other related component.

Accordingly, it would be desirable to provide a one piece engine polymer hood for tractors, while providing solutions to the problems of pivotally mounting the hood, latching the hood and restricting the pivotal movement thereof.

The pivotal raising of a one piece hood requires the assistance of a spring assist mechanism to counterbalance the weight of the hood and facilitate the manual lifting of the hood. Gas springs can be utilized to offset the weight of the hood; however, gas springs often lose gradually the nitrogen gas from inside the spring. As a result, the force exerted by the spring lessens and causes the raising of the hood to become more difficult. Accordingly, it would be desirable to provide a mounting mechanism that could be adjustable to accommodate the changes in spring force and extend the operative life of the gas spring.

SUMMARY OF THE INVENTION

It is an object of this invention to overcome the aforementioned disadvantages of the prior art by providing a one piece polymer hood to enclose the engine compartment of a tractor.

It is another of this invention to provide a hinge mechanism, a latching apparatus and a position control mechanism for a one piece polymer engine hood assembly.

It is still another object of this invention to provide a mechanism to limit the extent of pivotal movement of the engine hood to provide at least two opened positions to expose the engine to various degrees of exposure.

It is a feature of this invention that the mechanism for limiting the pivotal movement of the engine hood includes a slide mechanism having first and second slotted openings interconnected by a passageway to provide an intermediate opened position offering only limited exposure to the tractor engine.

It is an advantage of this invention that the mechanism for limiting the pivotal movement of the engine hood requires manual manipulation to move the slide mechanism to allow the further movement of the engine hood to the fully opened position.

It is another advantage of this invention that the slide mechanism allows sufficient pivotal movement of the engine hood to gain access to all of the maintenance items requiring daily service, yet minimizes the exposure of the engine hood to wind forces by keeping the engine hood at a lower profile.

It is another advantage of this invention that the intermediate open position of the hood made available by the slide mechanism improves the effort required for the closure of the hood for daily maintenance activities.

It is another feature of this invention that the fully opened position of the hood enabled by the operation of the slide mechanism provides a hood prop to support the hood while the gas springs are removed from the hood structure.

It is still another feature of this invention that the slide mechanism also provides a limit for the maximum pivotal movement permitted to the hood to limit the travel of the hood in the event of severe wind conditions lifting the hood toward the fully opened position.

It is still another object of this invention to provide a mechanism for limiting the pivotal movement of a one piece polymer hood assembly for an agricultural tractor which is durable in construction, inexpensive of manufacture, carefree of maintenance, facile in assemblage, and simple and effective in use.

It is yet another object of this invention to provide a latching mechanism that can be operable with a one piece polymer tractor hood.

It is still another feature of this invention that the latching mechanism is adjustable to enable the mating latch components to interengage in a prescribed manner.

It is still another advantage of this invention that the latching mechanism is mounted on a one piece polymer tractor hood in a manner to be structurally sound and easily accessible by the operator.

It is a further object of this invention to provide an adjustable latching mechanism for an agricultural tractor which is durable in construction, inexpensive manufacture, carefree of maintenance, facile in assemblage, and simple and effective in use.

It is yet another object of this invention that the hinge mechanism can be integrated into the one piece tractor hood design in a strong and cost effective manner.

It is yet another advantage of this invention that the hinge support is movable to provide adjustment of the tractor hood in a side-to-side manner.

It is yet another feature of this invention that the hinge support includes a portion pivotable about a center pin and secured by a pair of bolts to provide a side-to-side adjustment of the one piece hood member.

It is a further feature of this invention that the hinge support includes an lower portion fixed to the block of the tractor engine and an upper portion pivotally supported on the lower portion to provide side-to-side adjustment.

It is a further object of this invention to provide a mechanism for pivotally supporting a one piece tractor hood from a tractor chassis to provide side-to-side adjustment thereof, which is durable in construction, inexpensive manufacture, carefree of maintenance, facile in assemblage, and simple and effective in use.

It is still a further object of this invention to provide a mounting mechanism for gas springs counterbalancing the weight of the tractor hood enclosure that is adjustable to increase the mechanical advantage of the gas spring as the spring force weakens over time.

It is still a further feature of this invention that the mounting bracket is provided with a plurality of mounting positions that vary the moment arm through which the spring force is exerted to offset the weight of the hood.

It is a further advantage of this invention that the operative life of the gas spring as part of a hood lift mechanism is increased.

It is still a further advantage of this invention that the gas spring can be re-mounted in an alternative mounting position to maintain a substantially constant counterbalancing force as the gas spring weakens over time.

It is yet another feature of this invention that the re-mounting of the gas spring to alternate mounting positions can be accomplished without providing additional parts.

It is yet a further object of this invention to provide an adjustable mounting mechanism for the gas spring forming part of a hood lift mechanism which is durable in construction, inexpensive manufacture, carefree of maintenance, facile in assemblage, and simple and effective in use.

These and other objects, features, and advantages are accomplished according to the instant invention by providing a rearwardly pivotable hood for enclosing a tractor engine is disclosed wherein a latching mechanism selectively retains the hood in a closed position. The latching mechanism includes a releasable clasp member mounted on the subframe structure supporting the air intake apparatus for the engine along a longitudinally extending centerline of the chassis forwardly of said hinge axis. The latching mechanism further includes a centrally positioned latch pin supported from the hood in alignable with the clasp member. A remote release mechanism, including a pivoted handle and a connecting linkage transferring pivotal motion of the handle to the clasp member for actuation thereof, is operable to effect actuation of the latching mechanism from a location along a transverse side of the hood. The pivoted handle can be accessed through the opening of the daily access door to initiate the raising of the hood for full access to the engine.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
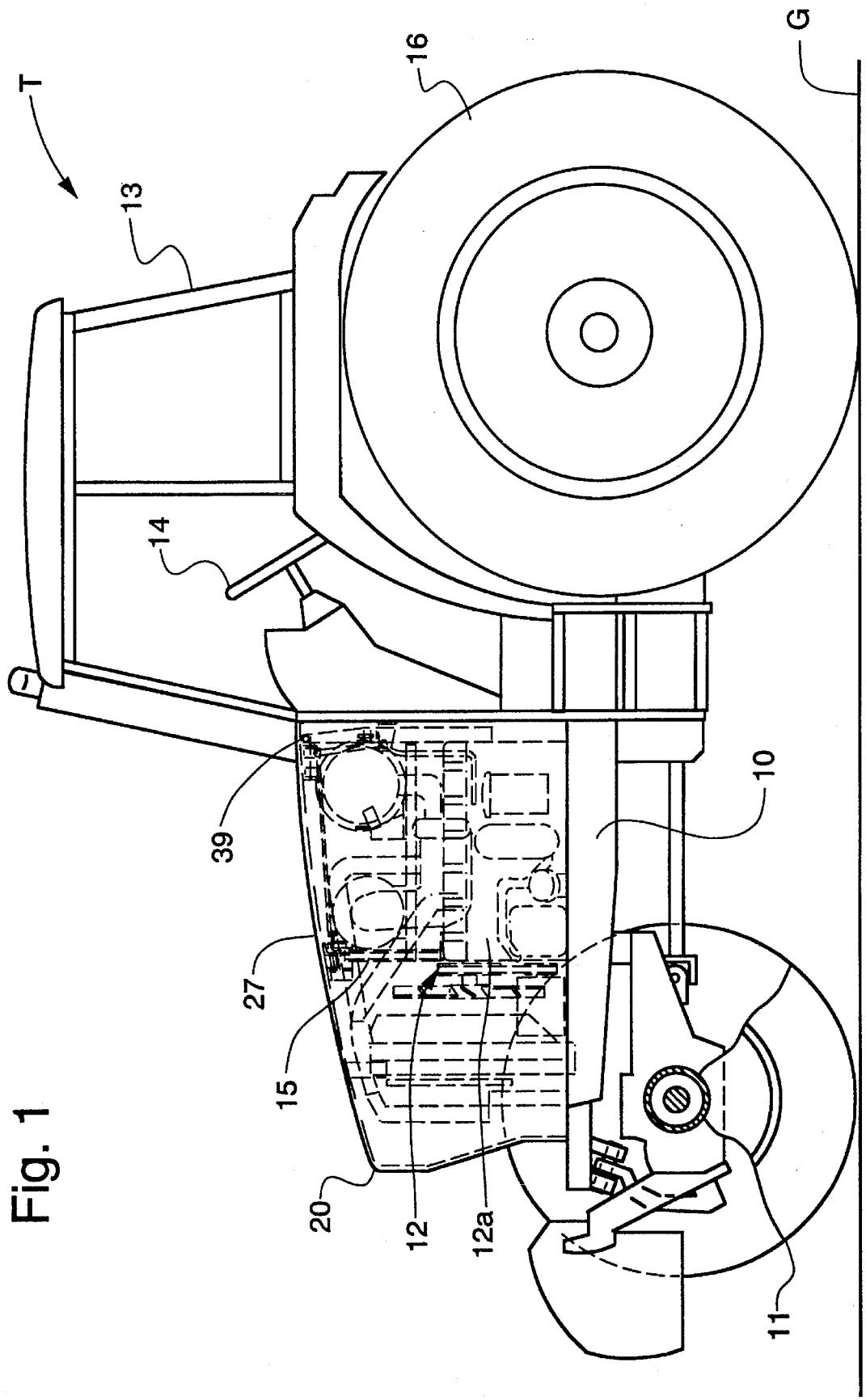
FIG. 1 is a side elevational view of a tractor incorporating the principles of the instant invention.
Figure 2:
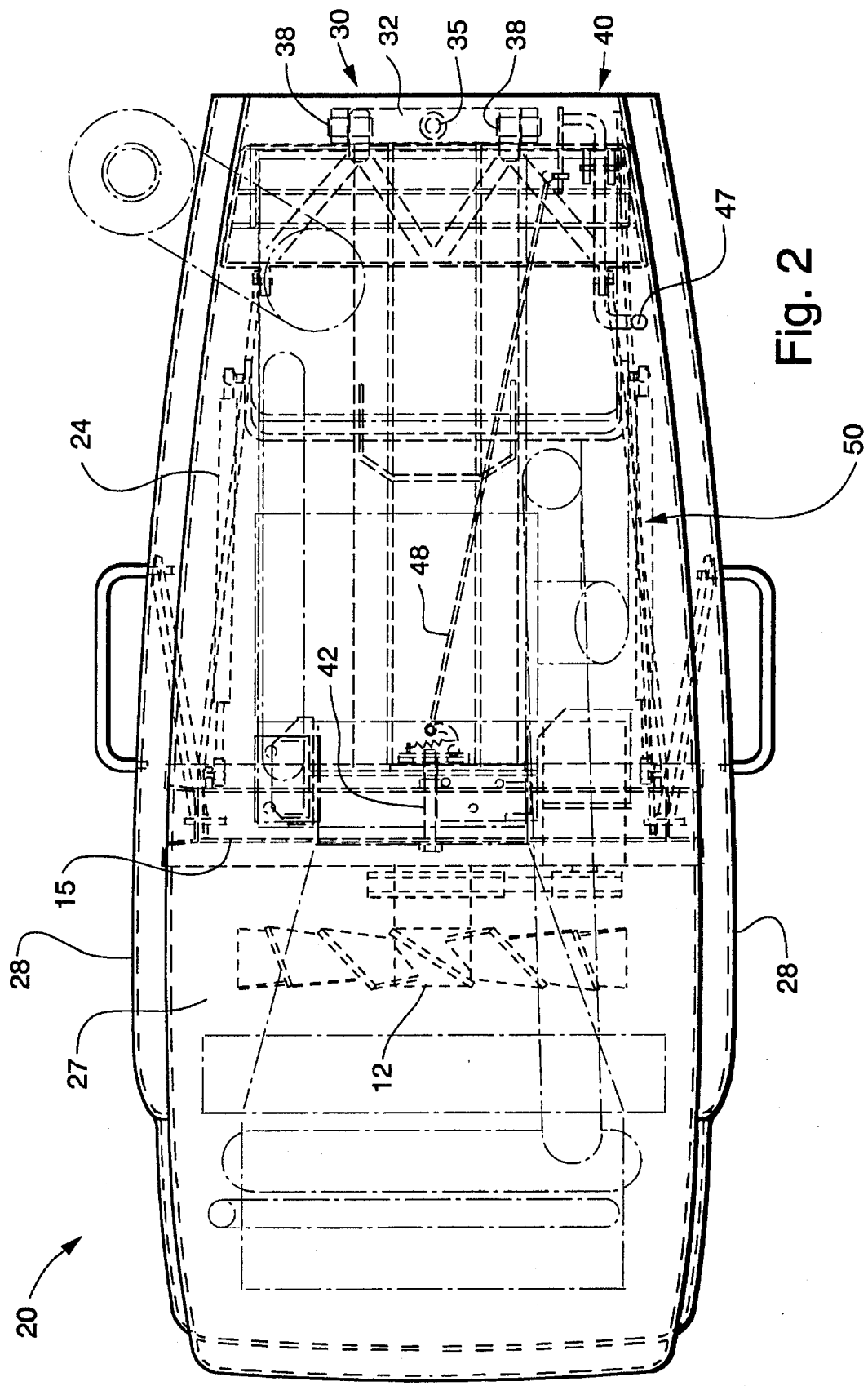
FIG. 2 is an enlarged top plan view of the hood enclosure shown in FIG. 1, the engine and various mounting components for the hood being shown in phantom.
Figure 3:
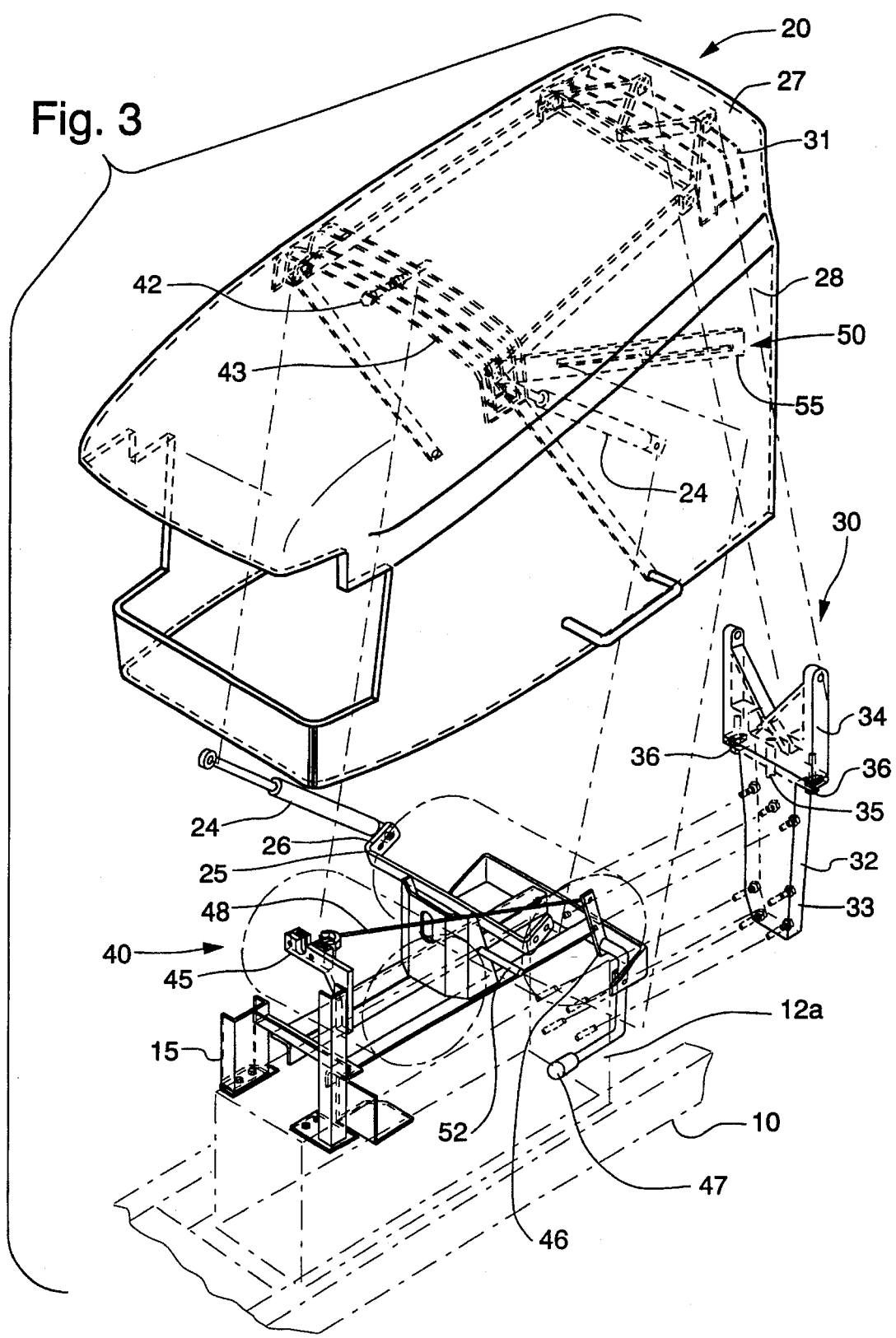
FIG. 3 is an exploded perspective view of the hood enclosure shown in FIG. 2, the hood and components bonded thereto being separated from the chassis mounting subframe and hinge support.

Referring now to the drawings and, particularly, to FIGS. 1–3, a representative view of an agricultural tractor incorporating the principles of the instant invention can best be seen. Left and right references are used as a matter of convenience and are determined by standing at the rear of the tractor and facing the forward end in the normal direction of travel. The tractor chassis 10 houses a conventional engine 12 serving to provide operational power for the tractor T and an operator's cab 13 positioned in an elevated location. The operator's cab 13 includes a steering wheel 14, positioned forwardly of the conventional operator's seat (not shown), to operate the steering of the front wheels 11 in a known manner. The chassis 10 is supported above the ground G in a conventional manner by forward steerable wheels 11 and rearward drive wheels 16 rotatably mounted in a customary transversely spaced orientation.

The hood 20 is mounted on the chassis 10 forwardly of the operator's cab 13 to enclose the engine 12. The hood 20 is pivotally mounted by a hinge mechanism 30 defining a generally horizontal, transverse hinge axis 39 positioned next to the operator's cab 13 to enable the hood to move upward and rearwardly toward the operator's cab 13. Gas springs 24 detachably connected to mounting brackets 25 affixed to the chassis subframe 15 interconnect the chassis 10 and the hood 20 to counterbalance a major portion of the weight of the hood to facilitate the manual lifting of the hood 20 in a manner described in greater detail below.

A latching mechanism 40 retains the hood 20 in its closed position completely enclosing the engine 12. The chassis subframe 15 is supported on the engine block 12a, which in turn is supported from the chassis 10, to provide support for the various mounting components as described in greater detail below. A slide mechanism 50 limits the opening of the hood from the closed position and defines an intermediate opened position from which most of the routine servicing of the engine 12 can be accomplished, as will also be described in greater detail below.

As best seen in FIGS. 3–7, the hinge mechanism 30 includes a hinge support 32 having a lower portion 33 detachably affixed to the engine block 12a and to the chassis subframe member 15 by fasteners. The hinge support 32 also has an upper portion 34 pivotally attached to the lower portion 33 by a generally vertically extending central pivot pin 35 and by a pair of opposing lateral fasteners 36 extending through respective enlarged or oversized openings 37 in the lower portion 33 to clamp the upper and lower portions 33, 34 together, yet provide a limited range of relative pivotal movement therebetween about the central pivot pin 35, and thereby provide side-to-side adjustment for the hood 20. The upper portion 34 also carries a pair of laterally disposed hinge pins 38 to provide a generally horizontally disposed hinge axis 39 for the one piece hood 20 formed from the bonding of several hood components, as described in further detail below.

Figure 4:
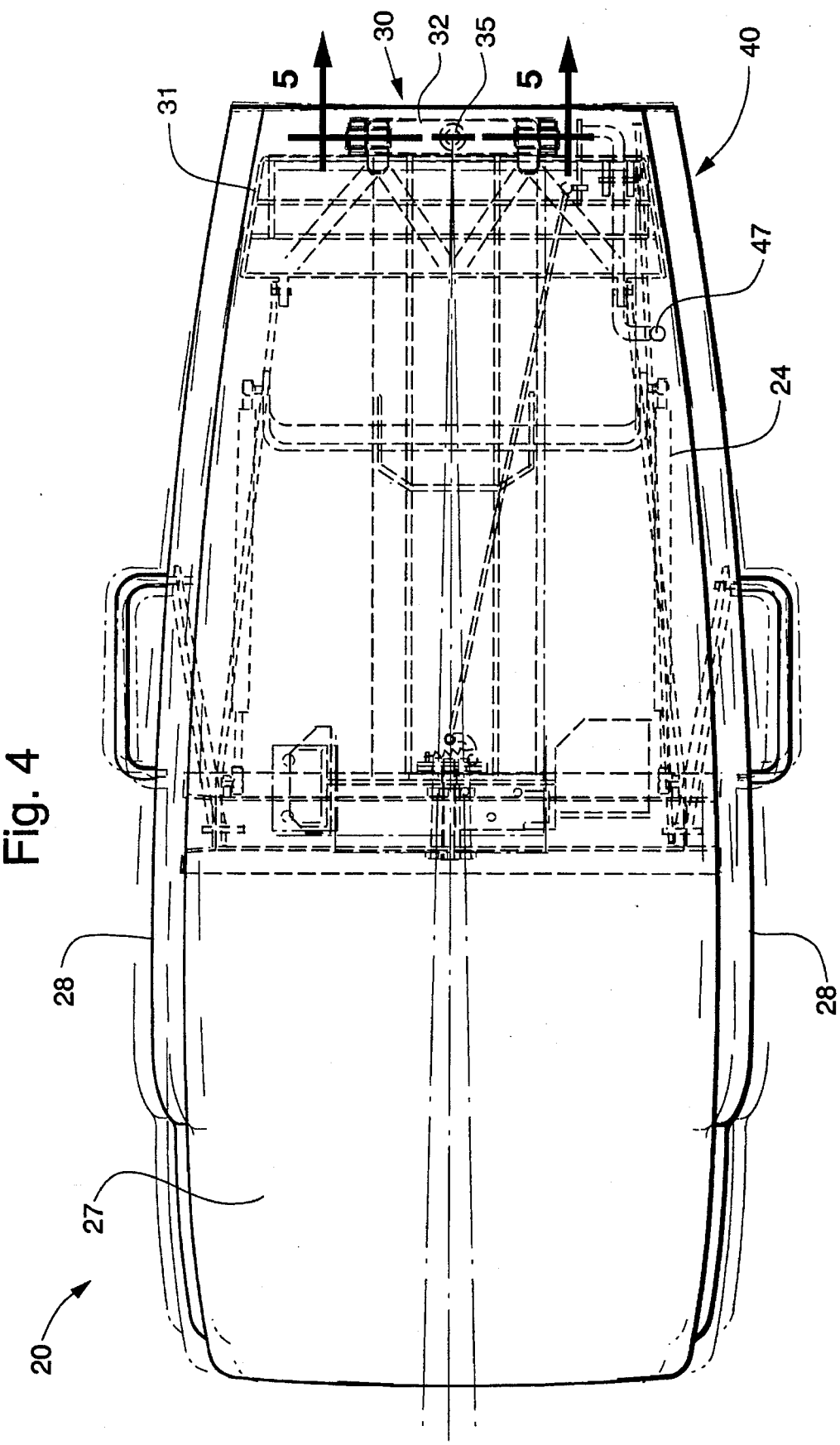
FIG. 4 is a simplified top plan view of the hood enclosure similar to that of FIG. 2, the side-to-side adjustment movement of the hood from the hinge support being shown in phantom.
Figure 5:
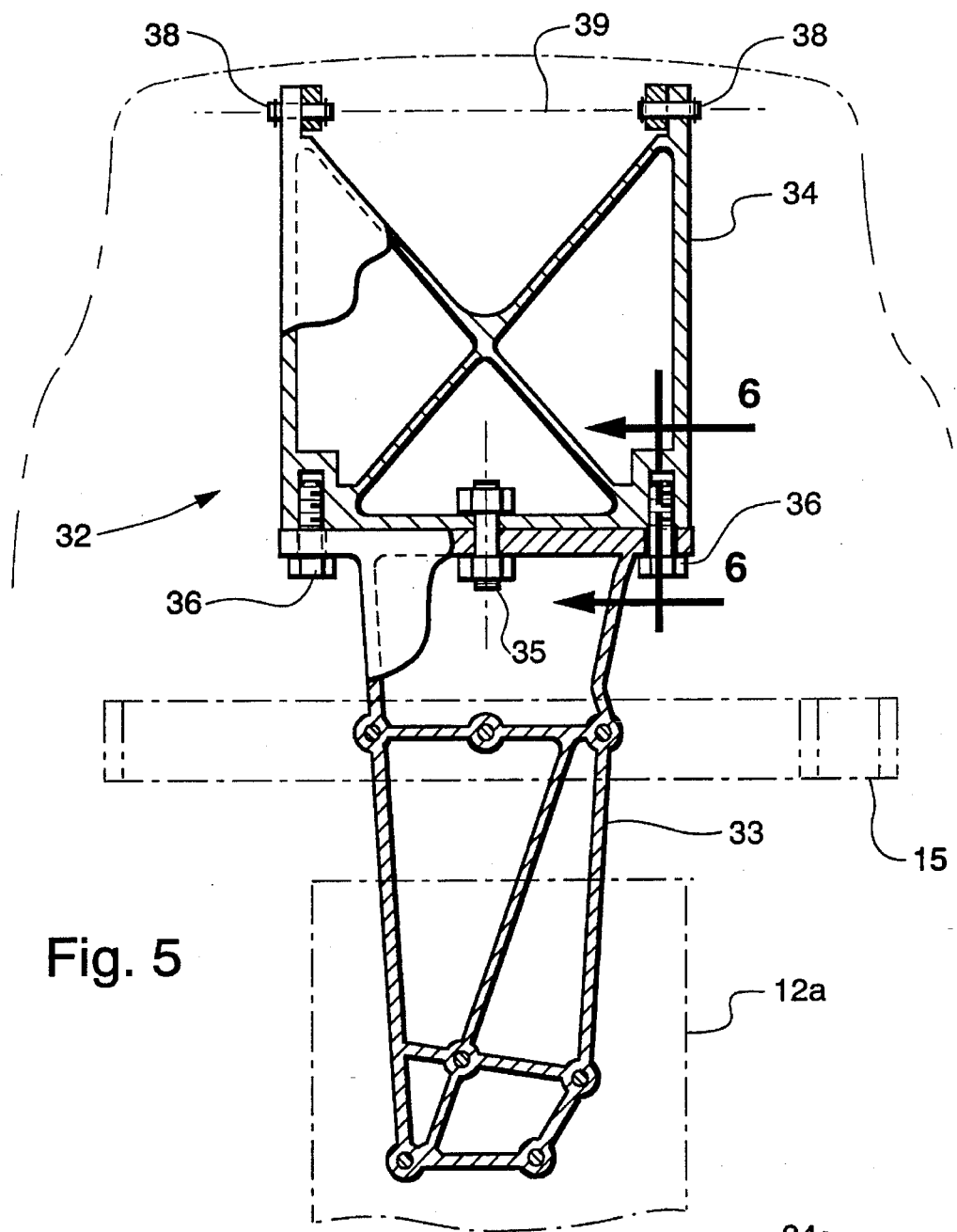
FIG. 5 is a cross-sectional view taken along lines 5—5 of FIG. 4 to depict the details of the hinge support, the structure to which the hinge support is mounted being shown in phantom.
Figure 6:
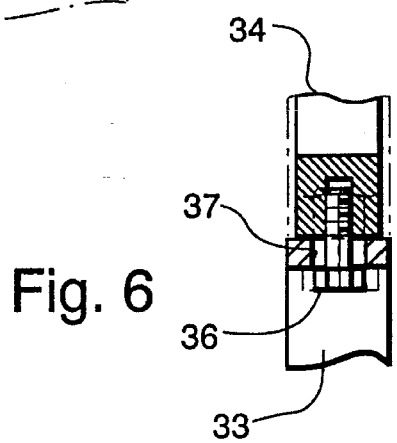
FIG. 6 is an enlarged detail view of the bolt connection through an oversized opening to allow a pivotal movement of the hinge support for side-to-side adjustment of the hood, as shown in phantom.

The pivotal movement of the upper portion 34 of the hinge support 32 relative to the lower portion 33 provides a side-to-side adjustment of the hood 20, as depicted in phantom in FIG. 4, to permit the orientation of the hood 20 to be matched to the chassis 10 for proper enclosure of the engine 12. By loosening the lateral fasteners 36, the upper portion 34 can be pivoted about the central pivot pin 35, which in turn rotates the hinge axis 39, to which the hood 20 is attached, about the central pivot pin 35. The oversized openings 37 provide a limited range of pivotal movement of the upper portion 34. A re-tightening of the lateral fasteners 36 locks the upper portion 34 against the lower portion 33 to fix the orientation of the hood 20 relative to the chassis 10 and also provide appropriate sealing around the radiator frame (not shown) for proper air flow.

The hood 20 has a contoured surface to provide a pleasing aesthetic appearance and excellent visibility. The top portion 27 of the hood 20 is manufactured preferably from a polymer such as fiberglass reinforced polyester with directed fiber preform by a process called liquid composite molding, which provides a high gloss finish, but does not permit the incorporation of mounting bosses. The thickness of the material is approximately 4 millimeters. The side panels 28 are also preferably manufactured from fiberglass reinforced polyester by a manufacturing process called sheet molding compound, which allow for the incorporation of mounting bosses. The side panels 28 are bonded to the top portion 27 by high tech, heat cured adhesives. As a result, the hood 20 can be pre-formed from polymer material with a relatively uniform thickness to provide a low cost hood with satisfactory strength characteristics and a high gloss exterior finish.

A hinge casting 31, preferably constructed of aluminum so that the thermal expansion of the hinge casting 31 is similar to that of the polymer hood 20, is formed with the same contoured shape as the interior surface of the top portion 27 of the hood 20 to which the hinge casting 31 is to be attached. The hinge casting 31 is bonded to the underside of the hood 20 with the same heat cured adhesives to form a permanent bond with the hood 20. The hinge casting 31 is then connected to the hinge support 32 to pivotally mount the hood 20 to the chassis 10 for movement about the rearwardly located hinge axis 39.

Figure 7:
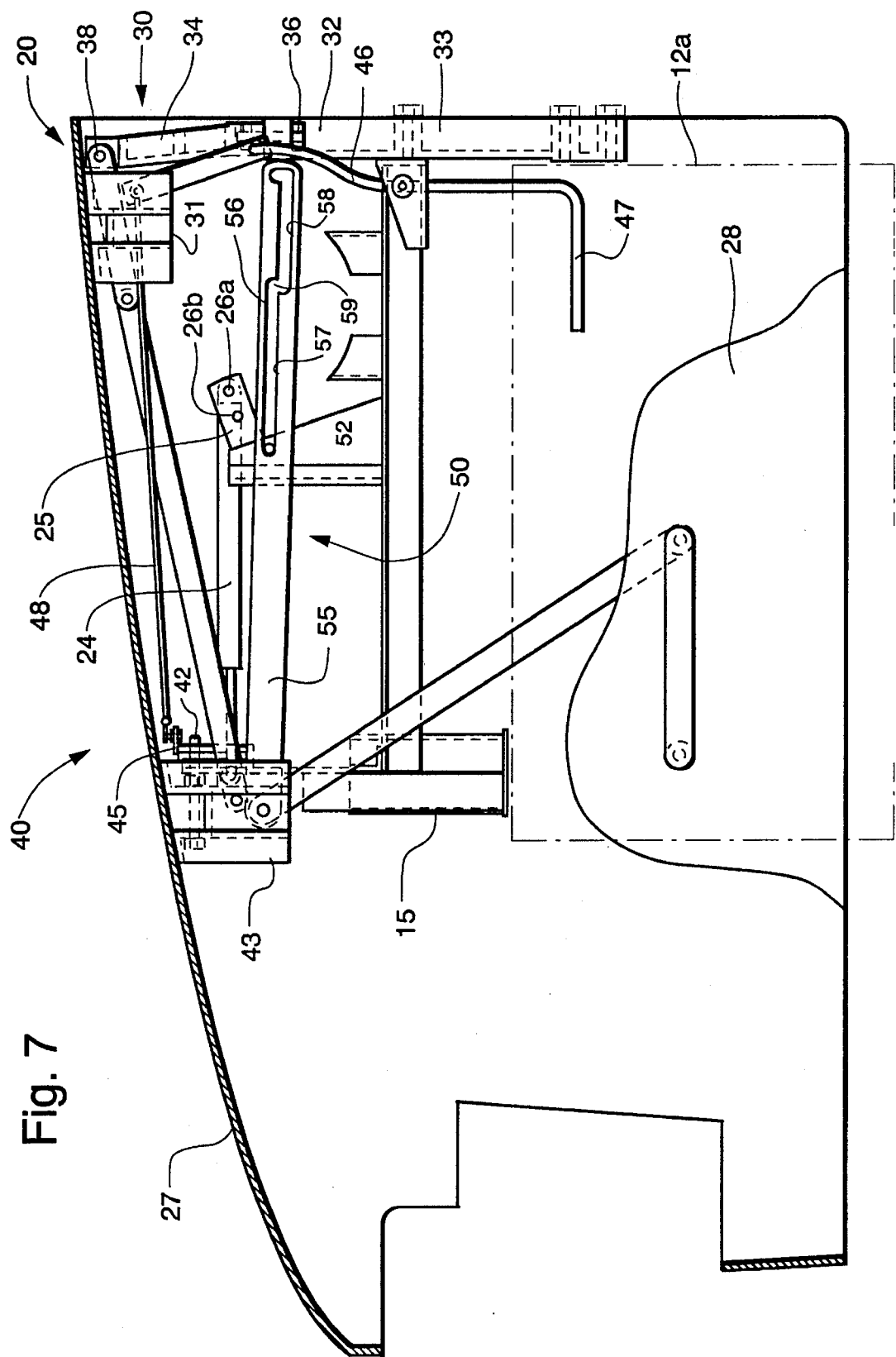
FIG. 7 is a side elevational view of the hood enclosure shown in FIG. 2, most of the side portion of the hood being broken away to better show the various mounting components and chassis subframe.

Referring to FIGS. 3, 4 and 7, one skilled in the art will see that the latching mechanism 40 includes a centrally positioned latch pin 42 attached to a central hood support 43 bonded to the interior surface of the top portion 27 of the hood 20 in substantially the same manner as the hinge casting 31. The releasable clasp 45 is supported from the chassis subframe 15 at a position to engage with the latch pin 42 when the hood 20 is moved to a closed position. A latch release linkage 46 includes a pivoted handle 47 positioned for convenient access by the operator and a connecting link 48 interconnecting the handle 47 and the releasable clasp 45 to transfer the pivoted motion of the handle 47 to the clasp 45 to effect actuation thereof in a conventional manner. One skilled in the art will recognize that the latch release linkage can also be formed as an equivalent cable release.

Referring now to the views of FIGS. 3, 4 and 7–11, the mechanism 24, 50 for controlling the pivotal movement of the hood 20 can best be seen. The raising of the hood 20 is assisted by gas springs 24 positioned on opposing sides of the hood 20. The nitrogen gas filled springs 24 provide a lifting force to offset the weight of a major portion of the hood 20 and attached components, such as the hinge casting 31 and the central hood support 43. As a result, the hood 20 is easier to lift manually when the latch pin 42 is released from the clasp 45. Since the nitrogen gas tends to escape from the springs 24 over a period of time, thereby causing the gas springs to weaken and lose spring force, it is undesirable that the overall counterbalance effect of the gas springs be lost.

Figure 10:
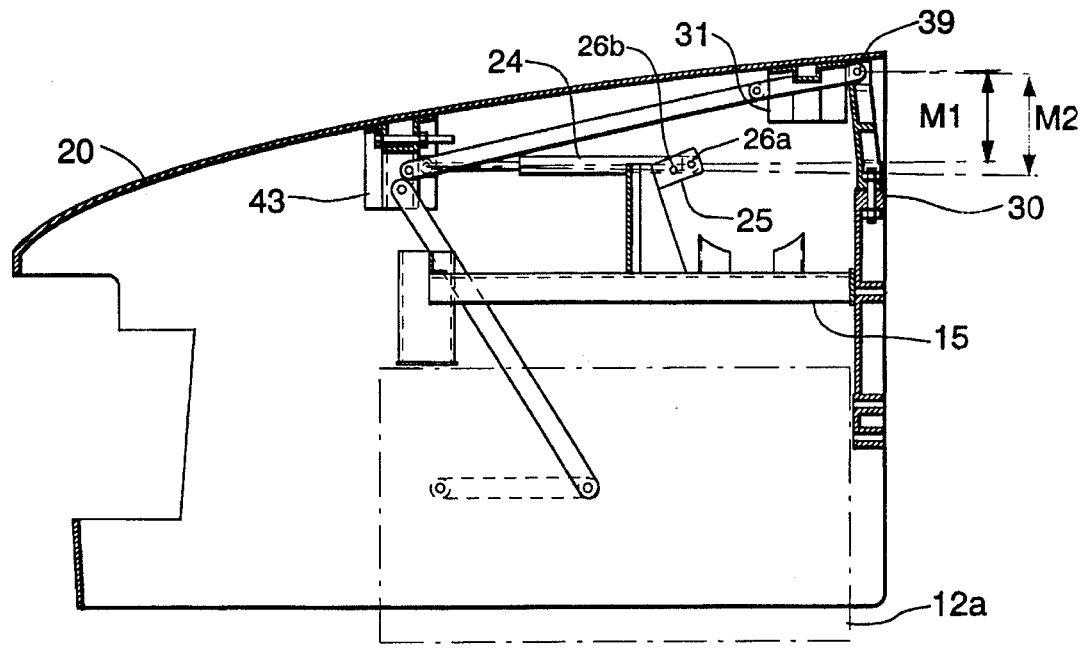
FIG. 10 is a schematic side elevation view of the hood enclosure in the closed position and depicting the alternate mounting positions of the gas spring counterbalancing the weight of the hood and the resultant changes in the moment arm through which the spring force is applied.
Figure 11:
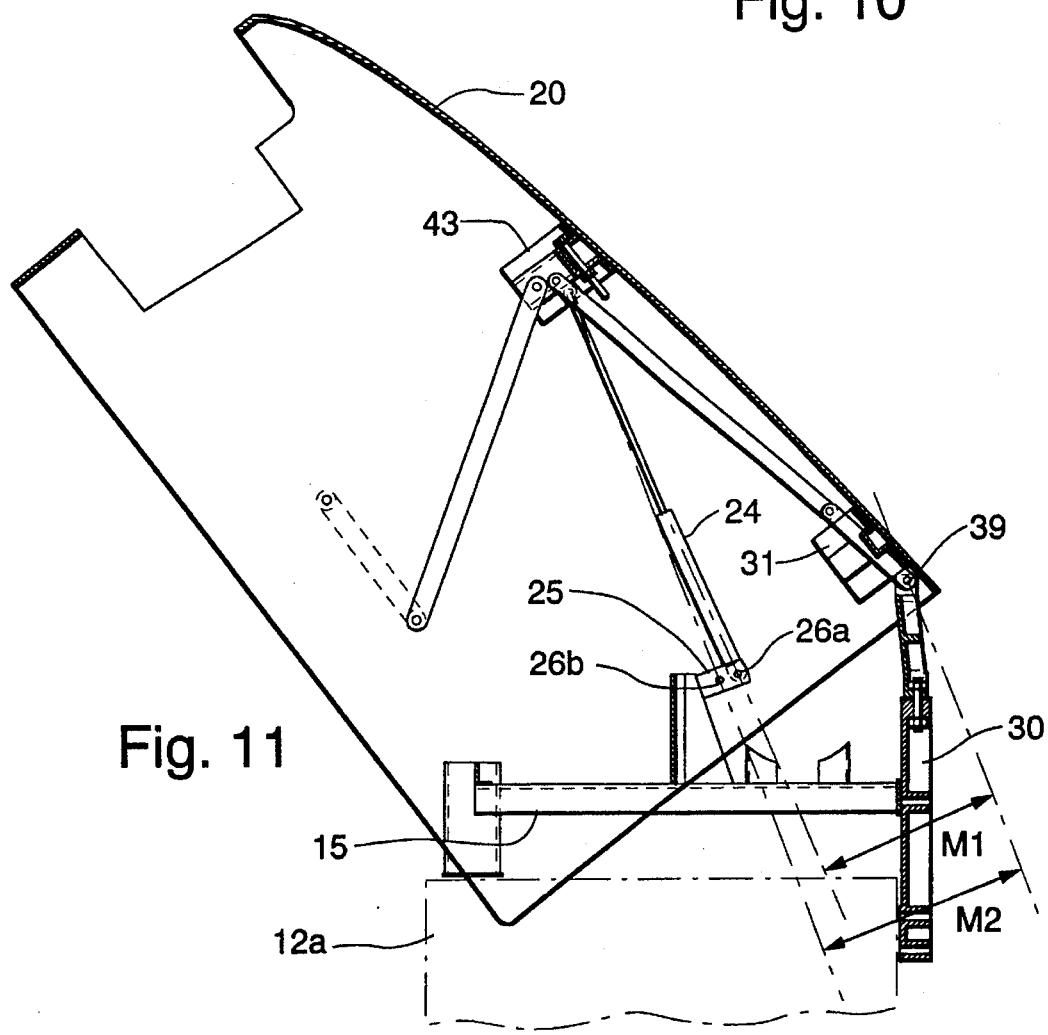
FIG. 11 is a schematic side elevation view of the hood enclosure similar to that of FIG. 10, except with the hood moved to the fully opened position and depicting the alternate mounting positions of the gas spring counterbalancing the weight of the hood and the resultant changes in the moment arm through which the spring force is applied.

Accordingly, the gas springs 24 are oriented between the central hood support 43 and the mounting brackets 25 affixed to the chassis subframe 15. The mounting brackets 25 are formed with at least two mounting holes 26 that are generally aligned with the hinge axis 39 such that mounting hole 26a is closer to the hinge axis 39 than mounting hole 26b. The lifting force of the gas springs 24 about the hinge axis 39 is a product of the spring force of the gas springs multiplied by the linear distance (M1, as depicted in FIGS. 10 and 11) between the mounting hole 26 to which the gas springs 24 are connected and the hinge axis 39.

By re-mounting the gas springs 24 at the alternate mounting hole 26b, the distance M2 between the mounting hole 26b and the hinge axis 39 is greater than the distance M1. As a result, the lifting force of the gas springs 24 can be maintained substantially constant as the spring force lessens by increasing the moment arm M1, M2 through which the spring force acts. One skilled in the art will realize that more than two mounting holes 26 can be provided to give yet a greater range of adjustment of the lifting force of the gas springs 24.

Because of the overall size of the hood 20, the amount of pivotal movement of the hood 20 about the hinge axis 39 required to fully expose the engine 12 to access by the operator is quite substantial. While a fully opened hood 20 is necessary for some maintenance or repair of the engine 12, normal daily maintenance generally requires only a partial opening of the hood 20 to an intermediate opened position. Pivotal movement of the hood 20 to an intermediate opened position also minimizes the exposure of the hood 20 to the wind or other external forces.

A slide mechanism 50 is provided to limit the movement of the hood 20 to an intermediate opened position unless manually manipulated to allow further pivotal movement of the hood 20 to the fully opened position. The slide mechanism 50 includes a slide pin 52 mounted to the chassis subframe 15 and extending generally horizontally outwardly therefrom. A slide member 55 is pivotally connected to the central hood support 43 so as to be movable with the hood 20 about the hinge axis 39. The slide member 55 has a bayonet slot 56 formed therein from a first opening 57 and a generally parallel second opening 58 interconnected by a passageway 59 extending perpendicularly thereto to form a continuous, two-part bayonet slot 56. The slide pin 52 is positioned within the bayonet slot 56 for slidable movement therein while the hood 20 pivotally moves about the hinge axis 39.

Figure 8:
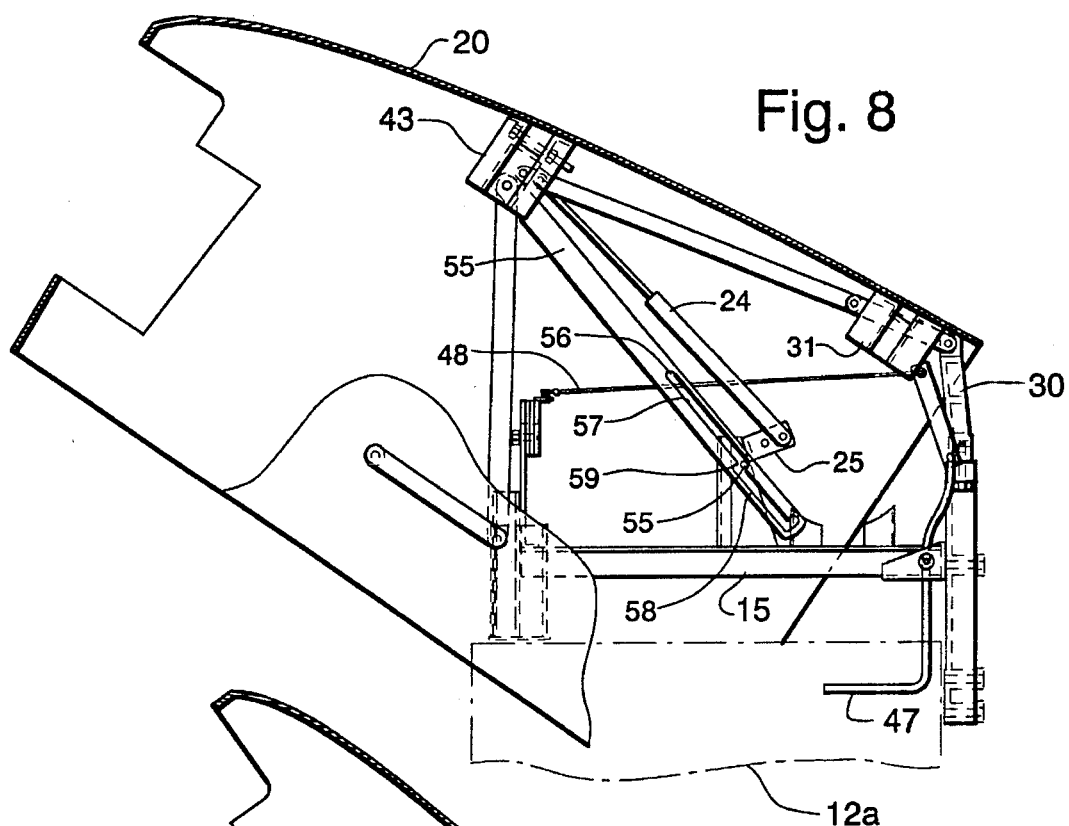
FIG. 8 is a schematic side elevational view of the hood shown in FIG. 7 with the hood raised to an intermediate opened position.
Figure 9:
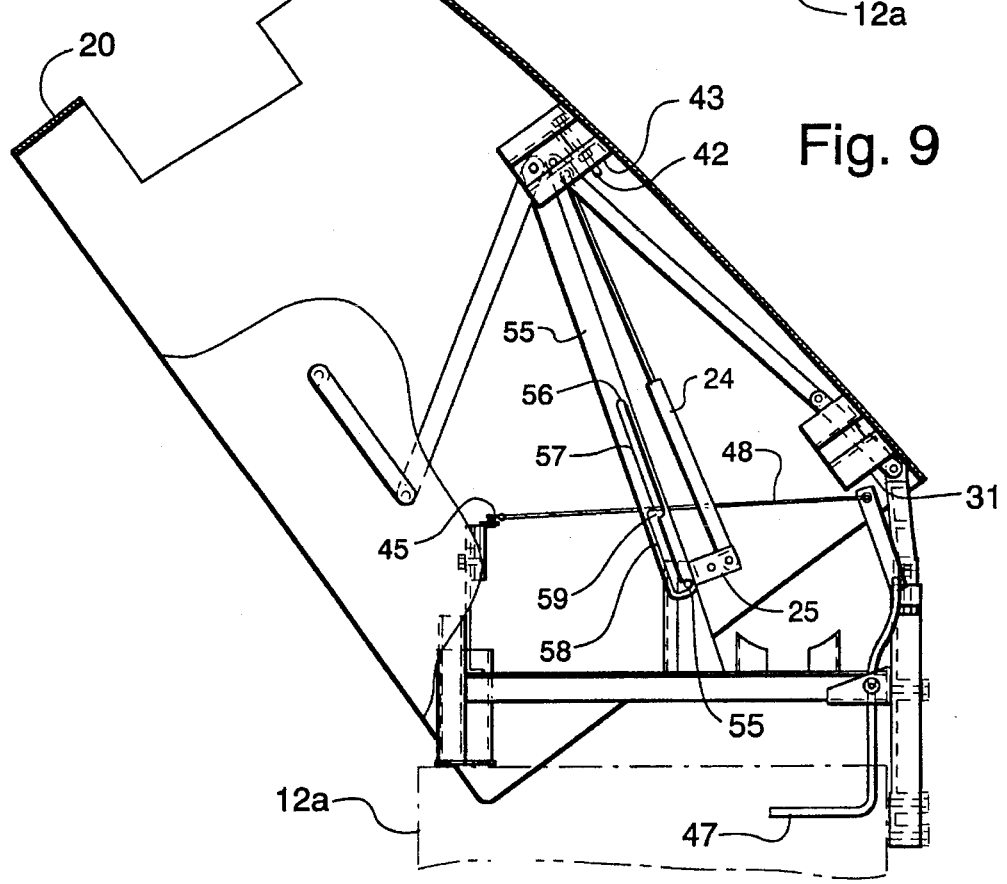
FIG. 9 is a schematic side elevational view of the hood similar to that shown in FIG. 8, but with the hood raised to a fully opened position.

Due to the configuration of the bayonet slot 56, the slide pin 52 stays within the first opening 57 when the hood is moving between the closed position and the intermediate opened position, as depicted in FIG. 8, the force of gravity keeping the slide member 55 resting against the slide pin 52 so that the slide pin 52 bottoms out against the end of the first opening when the hood reaches the intermediate opened position. To permit the hood to open beyond the intermediate opened position to the fully opened position, the slide member 55 must be manually lifted to allow the slide pin 52 to pass along the passageway 59 interconnecting the first and second openings 57, 58 and enter the second opening 58. The slide pin 52 can then move within the second opening 58 as the hood 20 pivotally moves to the fully opened position. The distal end of the second opening 58 is enlarged to allow the slide member 55 to fall by gravity when the hood 20 reaches the fully opened position and thereby restrain the hood 20 in the fully opened position until manually moved to allow the slide pin 52 to move within the second opening 58.

A hood 20 constructed as described above can be manufactured with relatively low cost tooling in a cost effective manner. The hood is supported on three points, the two laterally spaced rearward hinge pins 38 and the latch pin 42, which simplifies adjustment and reduces complexity. The slide mechanism 50 controls the opening height of the hood 20 and also serves as a safety catch in the event of a failure of a gas spring 24 if the hood 20 is moved beyond the intermediate opened position. The hinge components 31, 32 provide accurate adjustment of the hood 20 relative to the chassis 10 and can be integrated into the hood structure to provide strength and cost effectiveness.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A tractor comprising:
   a wheeled chassis adapted for movement over the ground;
   an engine mounted on said chassis to provide operative power therefor;
   an engine hood pivotally supported from said chassis by a rearwardly positioned, generally horizontal hinge axis for movement between a closed position in which said engine is inaccessibly covered and an opened position in which said engine is accessible, said engine including a subframe structure supporting air intake components of said engine; and
   a latching mechanism operable for selectively restraining said hood in said closed position, said latching mechanism including
   a releasable clasp member mounted along a longitudinally extending centerline of said subframe structure forwardly of said hinge axis;
   a centrally positionable latch pin alignable with said clasp member; and
   a remote release mechanism operable connected to said clasp member to effect actuation thereof from a location remote thereof.

2. The tractor of claim 1 wherein said latch pin is supported from said hood in alignment with said clasp member when said hood is in said closed position.

3. The tractor of claims 2 wherein said release mechanism includes a pivoted handle accessible from a transverse side of said hood, said handle being connected to said clasp member by a linkage mechanism such that a pivotal movement of said handle is transferred to said clasp member for actuation thereof.

4. The tractor of claim 3 wherein said chassis supports a daily access door movable between opened and closed positions for selective access to a limited portion of said engine, said handle being accessible through an opening formed by the movement of said daily access door to said opened position.

5. In a tractor having a wheeled chassis adapted for movement over the ground; an engine mounted on said chassis to provide operative power therefor; a subframe structure supporting air intake components of said engine; an engine hood pivotally supported from said chassis by a rearwardly positioned, generally horizontal hinge axis for movement between a closed position in which said engine is inaccessibly covered and an opened position in which said engine is accessible; a hinge member defining a rearwardly positioned hinge axis for supporting said hood from said chassis for said pivotal movement; and a latching mechanism operable for selectively restraining said hood in said closed position, an improved latching mechanism comprising:

- a releasable clasp member mounted on said subframe structure along a longitudinally extending centerline of said chassis forwardly of said hinge axis;
- a centrally positionable latch pin supported from said hood in alignable with said clasp member when said hood is in said closed position; and
- a remote release mechanism operable connected to said clasp member to effect actuation thereof from a location remote thereof.

6. The tractor of claim 5 wherein said release mechanism includes a pivoted handle accessible from a transverse side of said hood, said handle being connected to said clasp member by a linkage mechanism such that a pivotal movement of said handle is transferred to said clasp member for actuation thereof.

* * * * *